United States Patent
Cowling et al.

(10) Patent No.: US 9,772,783 B2
(45) Date of Patent: Sep. 26, 2017

(54) CONSTRUCTING AN INDEX TO FACILITATE ACCESSING A CLOSED EXTENT IN AN APPEND-ONLY STORAGE SYSTEM

(71) Applicant: Dropbox, Inc., San Francisco, CA (US)

(72) Inventors: James Cowling, San Francisco, CA (US); James Turner, Mountain View, CA (US)

(73) Assignee: Dropbox, Inc., San Francisco, CA (US)

( * ) Notice: Subject to any disclaimer, the term of this patent is extended or adjusted under 35 U.S.C. 154(b) by 237 days.

(21) Appl. No.: 14/497,200

(22) Filed: Sep. 25, 2014

(65) Prior Publication Data

US 2016/0092125 A1    Mar. 31, 2016

(51) Int. Cl.
*G06F 17/30* (2006.01)
*G06F 3/06* (2006.01)
*G06F 12/02* (2006.01)

(52) U.S. Cl.
CPC ............ *G06F 3/0619* (2013.01); *G06F 3/065* (2013.01); *G06F 3/0655* (2013.01); *G06F 3/0688* (2013.01); *G06F 17/30091* (2013.01); *G06F 17/30185* (2013.01); *G06F 12/0253* (2013.01); *G06F 2212/7205* (2013.01)

(58) Field of Classification Search
CPC ......... G06F 17/30091; G06F 17/30185; G06F 12/0253; G06F 3/0619
See application file for complete search history.

(56) References Cited

U.S. PATENT DOCUMENTS

| 8,521,685 B1 | 8/2013 | Chatterjee |
| 2005/0273551 A1 | 12/2005 | Keays |
| 2006/0184722 A1* | 8/2006 | Sinclair ............... G06F 3/0607 711/103 |
| 2007/0011660 A1 | 1/2007 | Garyali |
| 2008/0235560 A1 | 9/2008 | Colmer |
| 2008/0244743 A1 | 10/2008 | Largman |
| 2009/0172262 A1 | 7/2009 | Olbrich |
| 2011/0055170 A1 | 3/2011 | Mark |

(Continued)

OTHER PUBLICATIONS

U.S. Appl. No. 14/497,195, filed Sep. 25, 2014, Office Action, Jun. 30, 2016.

(Continued)

*Primary Examiner* — Scott A Waldron
*Assistant Examiner* — Fatima Mina
(74) *Attorney, Agent, or Firm* — Hickman Palermo Becker Bingham LLP

(57) ABSTRACT

The disclosed embodiments relate to the design of an append-only data storage system that stores sets of data blocks in extents that are located in storage devices in the system. During operation of the system, when an extent becomes full, the system changing the extent from an open state, wherein data can be appended to the extent, to a closed state, wherein data cannot be appended to the extent. Changing the extent from the open state to the closed state includes performing the following operations at one or more storage devices that contain copies of the extent: constructing an index to facilitate accessing data blocks in a copy of the extent contained in the storage device; and appending the index to the copy of the extent in non-volatile storage in the storage device.

23 Claims, 13 Drawing Sheets

(56) References Cited

U.S. PATENT DOCUMENTS

| | | | |
|---|---|---|---|
| 2011/0099351 A1* | 4/2011 | Condict | G06F 3/0608 |
| | | | 711/216 |
| 2011/0276744 A1* | 11/2011 | Sengupta | G06F 12/0866 |
| | | | 711/103 |
| 2013/0173536 A1* | 7/2013 | Gokhale | G06F 17/30286 |
| | | | 707/610 |
| 2013/0282955 A1* | 10/2013 | Parker | G06F 12/0246 |
| | | | 711/103 |
| 2014/0115239 A1 | 4/2014 | Kong | |
| 2014/0164319 A1 | 6/2014 | Smarr | |
| 2015/0186270 A1 | 7/2015 | Peng | |
| 2016/0062694 A1* | 3/2016 | Makkar | G06F 3/0629 |
| | | | 711/111 |

OTHER PUBLICATIONS

U.S. Appl. No. 14/497,195, filed Sep. 25, 2014, Final Office Action, Dec. 31, 2016.

Cowling, U.S. Appl. No. 14/497,195, filed Sep. 25, 2014, Interview Summary, Jan. 27, 2017.

U.S. Appl. No. 14/497,212, filed Sep. 25, 2014, Office Action, Sep. 22, 2016.

Crowling, U.S. Appl. No. 14/497,195, filed Sep. 25, 2014, Notice of Allowance, Mar. 23, 2017.

Cowling, U.S. Appl. No. 14/497,212, filed Sep. 25, 2014, Notice of Allowance, Feb. 23, 2017.

Cowling, U.S. Appl. No. 14/497,195, filed Sep. 25, 2014, Advisory Action, Mar. 9, 2017.

* cited by examiner

HASH TABLE ENTRY 930

CONSTRUCTING AN INDEX TO FACILITATE ACCESSING A CLOSED EXTENT IN AN APPEND-ONLY STORAGE SYSTEM

RELATED APPLICATIONS

This application is related to a co-pending U.S. patent application entitled "Append-Only Storage System Supporting Open and Closed Extents," having Ser. No. 14/497,195 and filed on the same day as the instant application by inventors James Cowling and James Turner. This application is also related to a co-pending U.S. patent application entitled "Synchronizing Copies of an Extent in an Append-Only Storage System," having Ser. No. 14/497,212 and filed on the same day as the instant application by inventors James Cowling and James Turner.

BACKGROUND

Field

The disclosed embodiments generally relate to data storage systems. More specifically, the disclosed embodiments relate to the design of a data storage system that provides an append-only storage model that supports open and closed extents for storing data blocks.

Related Art

Organizations are beginning to use cloud-based storage systems to store large volumes of data. These cloud-based storage systems are typically operated by hosting companies that maintain a sizable storage infrastructure, often comprising thousands of servers that that are sited in geographically distributed data centers. Customers typically buy or lease storage capacity from these hosting companies. In turn, the hosting companies provision storage resources according to the customers' requirements and enable the customers to access these storage resources.

To provide fault tolerance, data items are often replicated across different storage devices. In this way, if a specific storage device fails, the data items on the failed storage device can be accessed and recovered from other storage devices. However, this replication can complicate repair operations, because multiple data blocks may have to be retrieved from different storage devices to repair a single data block. These repair operations are further complicated if any of the data blocks change during the repair process. To prevent such problems, storage systems typically use locks to prevent updates to associated data blocks during a repair operation. However, if a repair operation takes a significant amount of time, these locks can create performance problems for applications that need to access these data blocks.

Hence, what is needed is a data storage system that facilitates repair and other related operations without the performance problems associated with using locks.

SUMMARY

The disclosed embodiments relate to the design of an append-only data storage system that stores sets of data blocks in extents that are located in storage devices in the system. During operation of the system, when an extent becomes full, the system changing the extent from an open state, wherein data can be appended to the extent, to a closed state, wherein data cannot be appended to the extent. Changing the extent from the open state to the closed state includes performing the following operations at one or more storage devices that contain copies of the extent: constructing an index to facilitate accessing data blocks in a copy of the extent contained in the storage device; and appending the index to the copy of the extent in non-volatile storage in the storage device.

In some embodiments, constructing the index includes constructing a hash table by: obtaining a hash key for each data block in the extent; and using the obtained hash keys to construct the hash table that contains entries for each data block in the extent, wherein each entry in the hash table specifies an offset and a length of an associated data block within the extent to facilitate subsequently accessing the data block.

In some embodiments, constructing the hash table involves constructing a cuckoo hash table, wherein a hash key for each data block is divided into multiple integers and a checksum, wherein the multiple integers provide probe locations for the data block in the cuckoo hash table, and wherein the checksum is stored as a key in an entry for the data block in the cuckoo hash table.

In some embodiments, constructing the hash table involves: constructing a key list that includes a hash key for each entry in the hash table; and appending the key list to the copy of the extent in non-volatile storage.

In some embodiments, constructing the index involves: constructing a deleted list that specifies locations in the index for data blocks that have been garbage-collected from the extent; and appending the deleted list to the copy of the extent in non-volatile storage.

DETAILED DESCRIPTION

The following description is presented to enable any person skilled in the art to make and use the present embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present embodiments. Thus, the present embodiments are not limited to the embodiments shown, but are to be accorded the widest scope consistent with the principles and features disclosed herein.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium. Furthermore, the methods and processes described below can be included in hardware modules. For example, the hardware modules can include, but are not limited to, application-specific integrated circuit (ASIC) chips, field-programmable gate arrays (FPGAs), and other programmable-logic devices now known or later developed. When the hardware modules are activated, the hardware modules perform the methods and processes included within the hardware modules.

Before describing the details of the data storage system, we first describe the structure of an exemplary online content-management system 120 that includes such a data storage system and that operates within such a content-management environment 105.

Content-Management Environment

Figure 1:
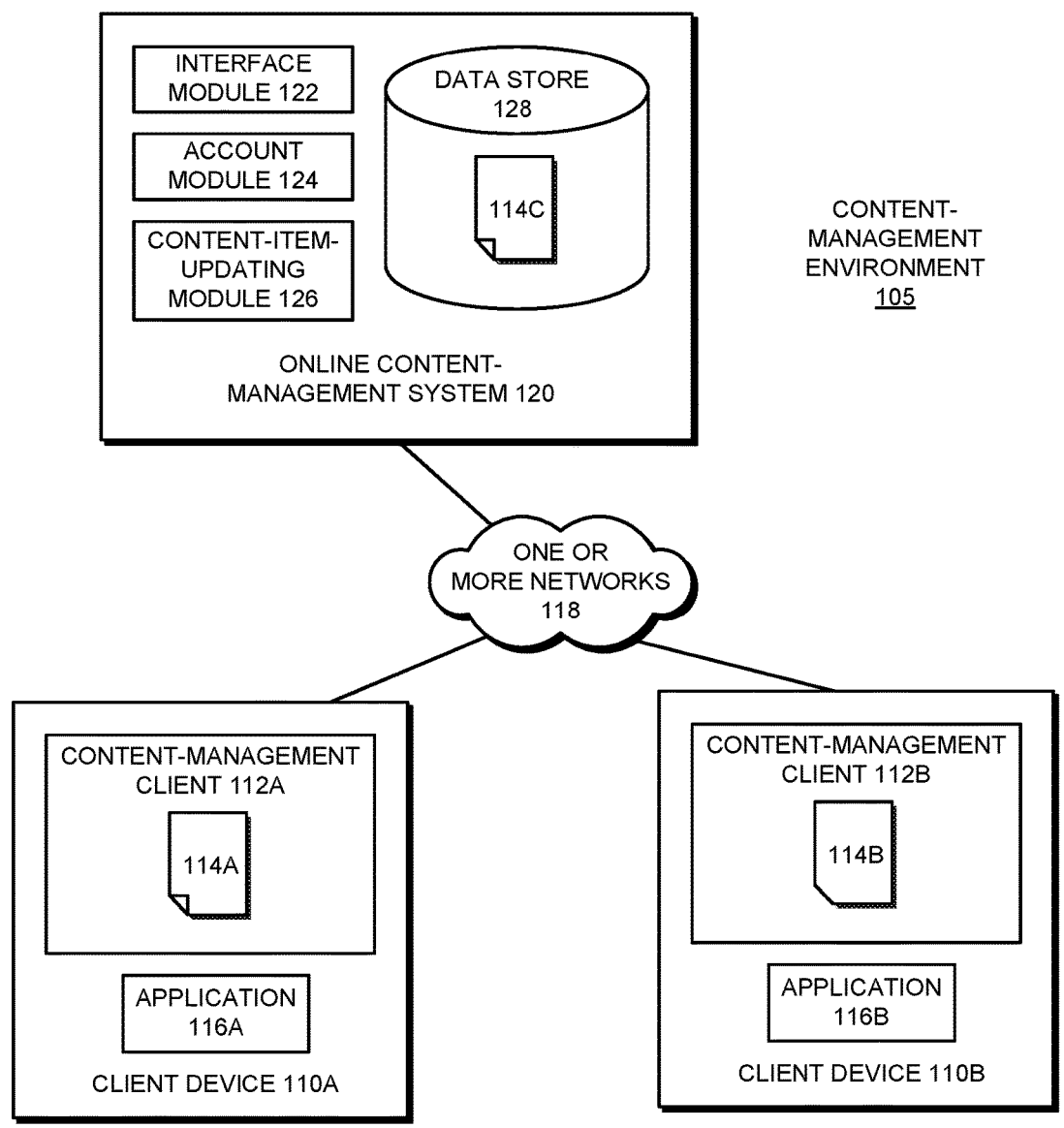
FIG. 1 illustrates a content-management environment in accordance with the disclosed embodiments.

FIG. 1 illustrates content-management environment 105 according to various embodiments. As may be understood from this figure, content-management environment 105 includes a plurality of client devices 110A and 110B (collectively 110) and an online content-management system 120 that are interconnected by one or more networks 118. Various aspects of the client devices 110 and online content-management system 120 are discussed below.

Client Devices

In various embodiments, each client device 110 may selectively execute a content-management client application 112A and 112B (collectively 112) (also referred to as a "content-management client") that may be used to access content items stored within online content-management system 120. In some embodiments, synchronized copies of a content item 114A, 114B and 114C are maintained on client devices 110A and 110B and within online content-management system 120, respectively. (Note that a "content item" can include a file, a folder, a set of folders, or any other type of data object.) In some embodiments, client devices 110 may provide a file-browser type interface (not shown) for directly manipulating the content items stored on online content-management system 120 without maintaining a local copy. Client devices 110 may also include applications 116A and 116B (collectively 116) that manipulate copies of content items 114A and 114B.

While only two client devices 110A and 110B are shown in FIG. 1 for purposes of clarity, it should be understood by those skilled in the art that many client devices 110 may simultaneously connect through network(s) 118 to online content-management system 120 at any given time. Examples of suitable client devices 110 include, but are not limited to, a desktop computer; mobile computing devices, such as a laptop or a tablet; and handheld devices, such as a smartphone (e.g., an IPHONE®, BLACKBERRY®, or ANDROID™-based smartphone). Each client device 110 may store a local, synched copy of one or more content items from within online content-management system 120, and the content items may be stored in any suitable format. When content-management client 112 presents content items that are stored within the online content-management system 120 to a user, the content items may be arranged in folders and the folders themselves may be arranged in other folders, or in any other arbitrary arrangement supported by online content-management system 120, as determined by the user. However, one of skill in the art should understand in light of this disclosure that each user's content item storage architecture may be considerably different from the next, and in some instances, the content item storage architecture may be implemented to maximize storage and content item retrieval efficiency.

Content-Management System

Online content-management system 120 stores content items and manages access to those content items via client devices 110. Online content-management system 120 and its components may be implemented using any appropriate hardware and software that supports file serving, storage, and retrieval functions. For example, online content-management system 120 may be implemented in a single server or multiple servers.

In various embodiments, online content-management system 120 includes interface module 122, account module 124, content-item-updating module 126, and data store 128. Some of the elements of online content-management system 120 are discussed below.

Content-Management System—Interface Module

In particular embodiments, interface module 122 may facilitate content item access and content item storage operations among online content-management system 120 and client devices 110. Interface module 122 may receive content items from and send content items to client devices 110 consistent with the user's preferences for sharing content items. Interface module 122 may also act as the counterpart to a client-side file-explorer style user interface that allows a user to manipulate content items directly stored on online content-management system 120. In some embodiments, software on client devices 110 may integrate network-stored content items with the client's local file system to enable a user to manipulate network-stored content items through the same user interface (UI) used to manipulate content items on the local file system, e.g., via a file explorer, file finder or browser application. As an alternative or supplement to the client-side file-explorer interface, interface module 122 may provide a web interface for client devices 110 to access (e.g., via an application 116) and allow a user to manipulate content items stored within online content-management system 120. In this way, the user can directly manipulate content items stored within online content-management system 120.

Content-Management System—Data Store

In various embodiments, data store 128 may store content items such as those uploaded using client devices 110, or using any other suitable computing device. In the embodiment illustrated in FIG. 1, client device 110A, which is associated with a first user, is shown as locally storing at least one content item 114A, and client device 110B, which is associated with a second user, is shown as locally storing at least one content item 114B. As shown in FIG. 1, a copy of the locally stored content item 114C is maintained in data store 128 of online content-management system 120. In the embodiment illustrated in FIG. 1, content items 114A, 114B and 114C are local versions of the same shared document that reside on client devices 110A, 110B and online content-management system 120, respectively. Note that client devices 110A and 110B may also store other content items that are replicated on online content-management system 120, but are not shared with other client devices.

In various embodiments, data store 128 may maintain information identifying the user, information describing the user's file directory, and other information in a file journal that is maintained for each user. In some embodiments, the file journal may be maintained on online content-management system 120, and in other embodiments, a file journal (e.g., a "server-side file journal") may be maintained on both online content-management system 120 and locally on each client device 110. In various embodiments, the file journal may be used to facilitate the synchronization of the various copies of a particular content item that are associated with a user's account.

As a particular example, in the embodiment shown in FIG. 1, the system may be configured so that any changes that are made to content item 114A on particular client device 110A may also be automatically reflected in the copy of content item 114C stored within online content-management system 120 and the copy of the content item 114B on client device 110B. Similarly, any changes that are made to content item 114C on online content-management system 120 may also be automatically reflected in the copy of content item 114A stored on client device 110A, and the copy of content item 114B stored on client device 110B.

Also, content items 114A and 114B may be stored in local caches within content-management clients 112A and 112B, respectively. Alternatively, content items 114A and 114B may be stored in local file systems within content-management clients 112A and 112B. In some situations, content items 114A and 114B are stored in file system space that is reserved for content-management clients 112A and 112B. In other situations, content items 114A and 114B are stored in normal file system space that is not reserved for content-management clients 112A and 112B.

Content-Management System—Account Module

In particular embodiments, account module 124 may track content items stored in data store 128 and entries in the server-side file journal for each content item. As users grant content-item-access permissions to other users, account module 124 may update the server-side file journal associated with each relevant user in data store 128. Account module 124 may also track client devices 110 that are associated with each user's account. For example, a user may want to share all their content items among their desktop computer, tablet computer, and mobile device. To make such a sharing arrangement seamless to the user, the user's single account on online content-management system 120 may be associated with each of the user's respective client devices. In some embodiments, an application running on each respective client device 110 may help to coordinate synchronization of content items on the client device with corresponding versions of the content items within the user's account in online content-management system 120, and also with corresponding versions of the content items stored on the user's various other client devices.

Content-Management System—Content-Item-Updating Module

In particular embodiments, content-item-updating module 126 is configured to maintain consistency among different copies (versions) of a content item 114A, 114B and 114C that are located in client device 110A, client device 110B and online content-management system 120, respectively. This can be complicated, because the different versions 114A, 114B and 114C of the same shared content items may be simultaneously changed at client devices 110A-B and online content-management system 120. Hence, online content-management system 120 needs to enforce an updating policy to resolve conflicting updates to different versions of the same content item. For example, the copy of the content item 114C on online content-management system 120 can be the master copy of the content item, and updates to the various copies 114A and 114B of the content item can be serialized and applied one-at-a-time to the master copy 114C before being propagated back to the copies 114A and 114B located on client devices 110A and 110B.

Data Centers

Figure 2:
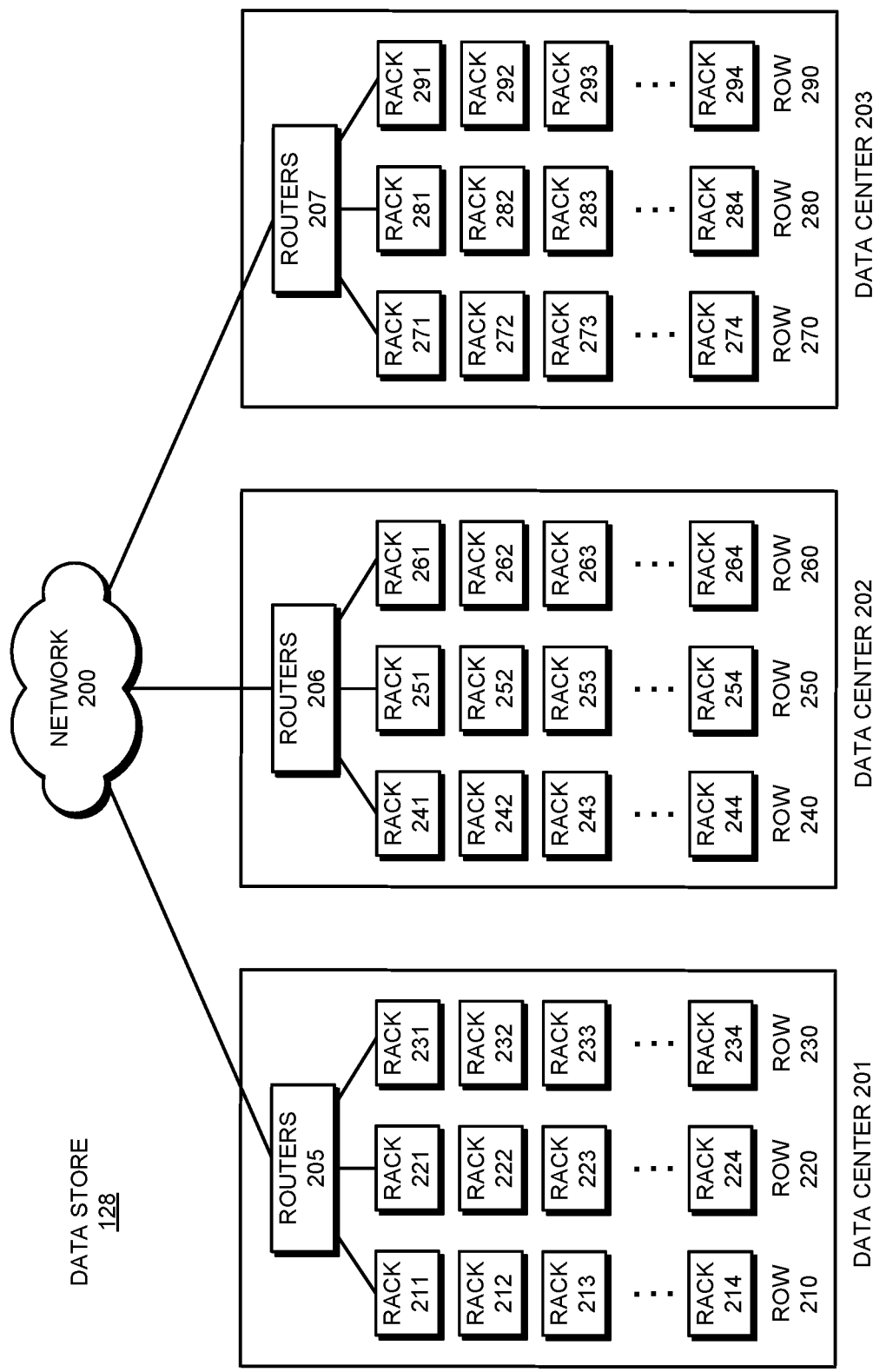
FIG. 2 illustrates a set of data centers in accordance with the disclosed embodiments.

We next describe the data centers that provide the infrastructure for the data storage system. FIG. 2 illustrates an exemplary data store 128 (from FIG. 1) that comprises a set of data centers 201-203 in accordance with the disclosed embodiments. Note that data store 128 can be smaller than the system illustrated in FIG. 2. (For example, data store 128 can comprise a single server that is connected to a number of disk drives, a single rack that houses a number of servers, a row of racks, or a single data center with multiple rows of racks.) As illustrated in FIG. 2, data store 128 can include a set of geographically distributed data centers 201-203 that may be located in different states, different countries or even on different continents.

Data centers 201-203 are coupled together through a network 200, wherein network 200 can be a private network with dedicated communication links, or a public network, such as the Internet, or a virtual-private network (VPN) that operates over a public network.

Communications to each data center pass through a set of routers that route the communications to specific storage nodes within each data center. More specifically, communications with data center 201 pass through routers 205, communications with data center 202 pass through routers 206, and communications with data center 203 pass through routers 207.

As illustrated in FIG. 2, routers 205-207 channel communications to storage devices within the data centers, wherein the storage devices are incorporated into servers that are housed in racks, wherein the racks are organized into rows within each data center. For example, the racks within data center 201 are organized into rows 210, 220 and 230, wherein row 210 includes racks 211-214, row 220 includes racks 221-224 and row 230 includes racks 231-234. The racks within data center 202 are organized into rows 240, 250 and 260, wherein row 240 includes racks 241-244, row 250 includes racks 251-254 and row 260 includes racks 261-264. Finally, the racks within data center 203 are organized into rows 270, 280 and 290, wherein row 270 includes racks 271-274, row 280 includes racks 281-284 and row 290 includes racks 291-294.

As illustrated in FIG. 2, data store 128 is organized hierarchically, comprising multiple data centers, wherein machines within each data center are organized into rows, wherein each row includes one or more racks, wherein each rack includes one or more servers, and wherein each server (also referred to as an "object storage device" (OSD)) includes one or more storage devices (e.g., disk drives).

Data Storage System

Figure 3:
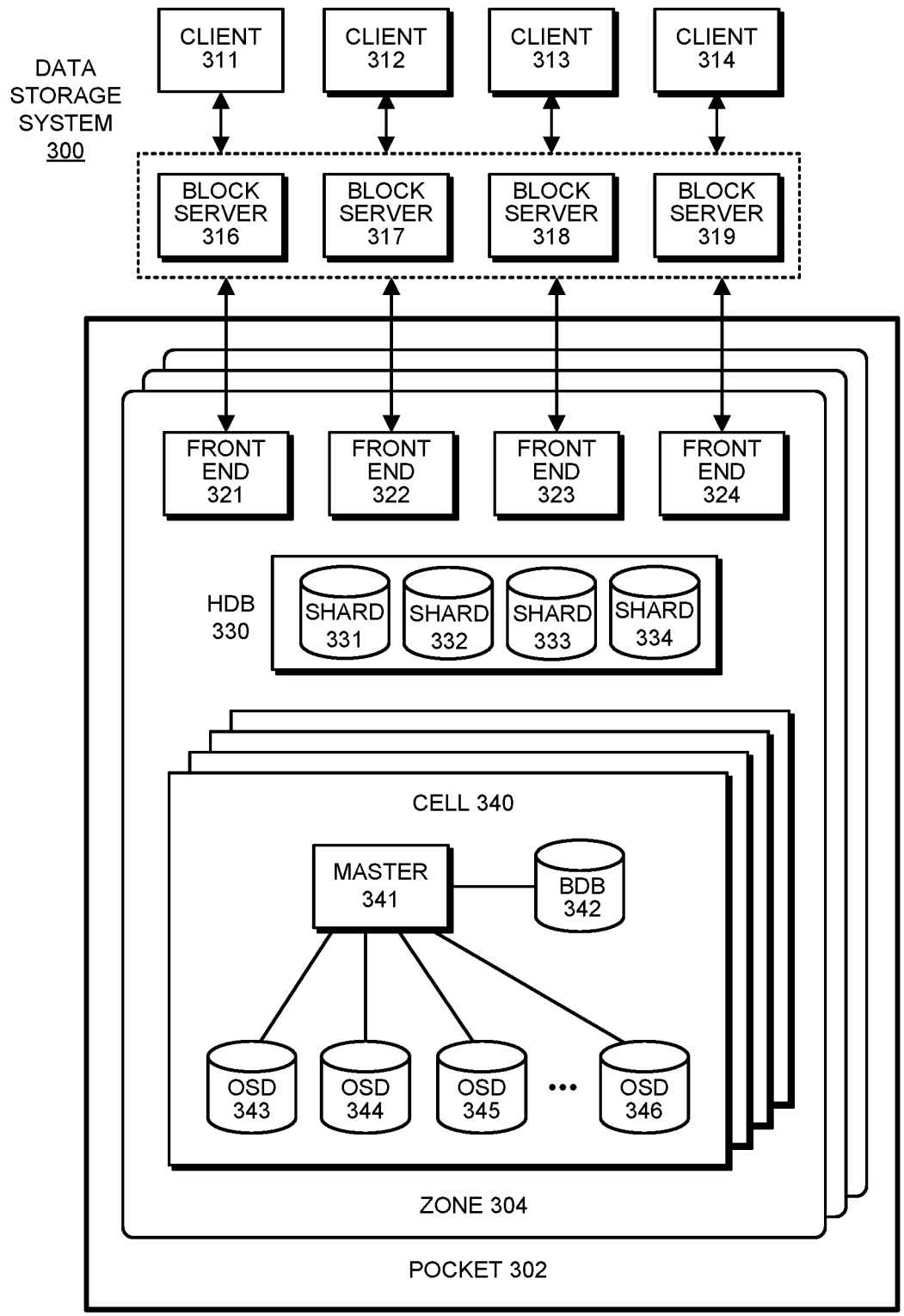
FIG. 3 illustrates the logical structure of the data storage system in accordance with the disclosed embodiments.

FIG. 3 illustrates the logical structure of the data storage system 300 in accordance with the disclosed embodiments. As illustrated in FIG. 3, data storage system 300 includes a logical entity called a "pocket" 302 that in some embodiments is equivalent to an Amazon S3™ bucket. Each pocket is completely distinct; nothing is shared between pockets. For example, in an exemplary implementation, the system provides a "block storage pocket" to store data files, and a "thumbnail pocket" to store thumbnail images for data objects. Note that the applications specify which pockets are to be accessed.

Within a pocket one or more "zones" exist that are associated with physical data centers, and these physical data centers can reside at different geographic locations. For example, one data center might be located in California, another data center might be located in Virginia, and another data center might be located in Europe. For fault-tolerance purposes, data can be stored redundantly by maintaining multiple copies of the data on different servers within a single data center and also across multiple data centers.

For example, when a data item first enters a data center, it can be initially replicated to improve availability and provide fault tolerance. It can then be asynchronously propagated to other data centers.

Note that storing the data redundantly can simply involve making copies of data items, or alternatively using a more space-efficient encoding scheme, such as erasure codes (e.g., Reed-Solomon codes) or Hamming codes to provide fault tolerance.

Within each zone (such as zone 304 in FIG. 3), there exist a set of front ends 321-324, a hash database (HDB) 330 and a set of "cells," such as cell 340 illustrated in FIG. 3. A typical cell 340 includes a number of object storage devices (OSDs) 343-346, wherein the individual OSDs 343-346 include storage devices that actually store data blocks. Cell 340 also includes a "master" 341, which is in charge of managing OSDs 343-346 and a bucket database (BDB) 342 described in more detail below. (Note that HDB 330 and BDB 342 are logical databases which can be stored redundantly in multiple physical databases to provide fault tolerance.)

Master 341 performs a number of actions. For example, master 341 can determine how many writeable buckets the system has at any point in time. If the system runs out of buckets, master 341 can create new buckets and allocate them to the storage devices. Master 341 can also monitor OSDs and associated storage devices, and if any OSD or storage device fails, master 341 can migrate the associated buckets to other OSDs.

As illustrated in FIG. 3, a number of block servers 316-319, which are typically located in a data center associated with a zone, can service requests from a number of clients 311-314. For example, clients 311-314 can comprise applications running on client machines and/or devices that access data items in data storage system 300. Block servers 316-319 in turn forward the requests to front ends 321-324 that are located within specific zones, such as zone 304 illustrated in FIG. 3. Note that clients 311-314 communicate with front ends 321-324 through block servers 316-319, and the front ends 321-324 are the only machines within the zones that have public IP addresses.

Files to be stored in data storage system 300 comprise one or more data blocks that are individually stored in data storage system 300. For example, a large file can be associated with multiple data blocks, wherein each data block is 1 MB to 4 MBs in size.

Moreover, each data block is associated with a "hash" that serves as a global identifier for the data block. The hash can be computed from the data block by running the data block through a hash function, such as a SHA-256 hash function. (The SHA-256 hash function is defined as a Federal Information Processing Standard (FIPS) by the U.S. National Institute of Standards and Technology (NIST).) The hash is used by data storage system 300 to determine where the associated data block is stored.

Get( ) Operation

The system performs a number of operations while processing data accesses on behalf of clients 311-314. For example, when a get( ) operation is received along with an associated hash, the hash is used to perform a lookup in HDB 330. This lookup returns an identifier for a "bucket" and associated cell where the data block is stored.

To streamline failure-recovery operations, a large number of data blocks can be aggregated into larger buckets. For example, a number of 1-4 MB data blocks can be aggregated into a single 1 GB bucket, wherein each bucket is stored in a specific cell. This enables the system to manipulate a small number of buckets during a failure-recovery operation instead of manipulating a large number of individual data blocks. Aggregating data blocks into buckets also greatly decreases the amount of metadata the system has to maintain and manipulate; this is advantageous because metadata is computationally expensive to maintain and manipulate.

Because a large number of data blocks can exist in data storage system 300, HDB 330 can potentially be very large. If HDB 330 is very large, it is advantageous to structure HDB 330 as a "sharded" database. For example, when performing a lookup based on a hash in HDB 330, the first 8 bits of the hash can be used to associate the hash with one of 256 possible shards, and this shard can be used to direct the lookup to an associated instance of HDB 330. For example, as illustrated in FIG. 3, HDB 330 can comprise 4 instances 331-334, wherein instance 331 is associated with shards 1-64, instance 332 is associated with shards 65-128, instance 333 is associated with shards 129-192 and instance 334 is associated with shards 193-256. In other embodiments, HDB 330 can be divided into more or fewer instances. (Note that a zone can include a "ZooKeeper™ cluster" that is responsible for mapping shards to specific target cells and also mapping shards to physical HDB machines.)

HDB instances 331-334 are logical databases that are mapped to physical databases, and to provide fault tolerance, each logical database can be redundantly stored in multiple physical databases. For example, in one embodiment, each HDB instance maps to three physical databases. If data storage system 300 is very large (for example containing trillions of data blocks), HDB 330 will be too large to fit in random-access memory. In this case HDB 330 will mainly be stored in non-volatile storage, which for example, can comprise flash drives or disk drives.

After the bucket and associated cell are identified for the get( ) operation, the system performs a lookup in a bucket database (BDB) 342 in the associated cell 340. This lookup returns an identifier for an object storage device (OSD) 343 where the bucket is located. Note that because each bucket is fairly large (e.g., 1 GB) and contains a large number of data blocks, BDB 342 is relatively small and can typically be stored in random-access memory, which greatly speeds up the lookup process.

Finally, within the OSD, the system performs a lookup based on the bucket and the hash to determine an offset and a length for the data block in a write-ahead log that stores data blocks for the bucket. The system then returns the data block from the determined offset in the write-ahead log. Note that because data storage system 300 is designed to store "immutable data" that does not change after it is written, it is efficient to store the immutable data in a write-ahead log, as opposed to a random-access structure. Because the data is never overwritten, writes do not require more complex and time-consuming random-access lookup mechanisms.

Put( ) Operation

During a put( ) operation, the system receives a data block to be written from a client. To process the put( ) operation, the system first computes a hash from the data block, for example using the SHA-256 technique described above. Next, the system selects a writeable bucket and an associated cell for the data block. Note that front ends 321-324 periodically poll all the BDBs to identify and then cache writeable buckets. This enables front ends 321-324 to keep track of a number of buckets (e.g., 10 to 100 buckets) that they know are writeable at any given time. Then, when a put( ) operation is subsequently received, a front end simply selects a cached bucket that it knows is writable.

Within the associated cell, the system uses an identifier for the selected bucket to perform a lookup in the BDB. This lookup returns one or more OSDs for the bucket. (Note that the bucket may be replicated across multiple OSDs to provide fault tolerance.) Within the OSDs, the system appends the data block to a write-ahead log that stores data blocks for the bucket. After the data is stably written to the OSDs, the system writes the hash-to-bucket mapping to the HDB 330.

Note that the master 341 modifies the BDB 342 and the front end 321 modifies the HDB 330. In general, master 341 is concerned with reliability of storage, and hence performs operations to facilitate redundancy and rebalancing, while the front end 321 is generally concerned with finding information and simply maps hashes to logical constructs, such as buckets.

Master 341 performs various operations to detect and handle failures. More specifically, master 341 periodically performs health checks on OSDs. If master 341 detects a failure in an OSD, the associated buckets are degraded and the master sets the buckets to be non-writable. Note that get( ) operations have to access the buckets where the blocks are stored, but put( ) operations can be directed to any bucket that is currently writeable, so when a problem happens with a bucket, the system simply marks the bucket as non-writeable. The system can continue performing get( ) operations on the degraded bucket, because there exist multiple copies of the degraded bucket.

To handle a failure associated with a bucket, master 341 tells the associated OSDs to freeze the bucket. Master 341 then tells the OSDs to replicate the bucket to a new OSD. The system then adds the new OSD to the cluster, increments the generation number for the OSD, and marks the bucket as writeable. (Note that when a degraded OSD is restarted after a failure, it will not accept any reads because its generation number is old.) The system guarantees that every OSD in the current generation has valid data.

The system also includes mechanisms to perform compaction operations. Although the data stored in data storage system 300 is immutable, the system often needs to delete data items when users remove them from the system. In some embodiments, the system tracks deleted data items in a log, and when the usable storage in a given bucket falls below a threshold, the system compacts the bucket.

Object Storage Device

Figure 4A:
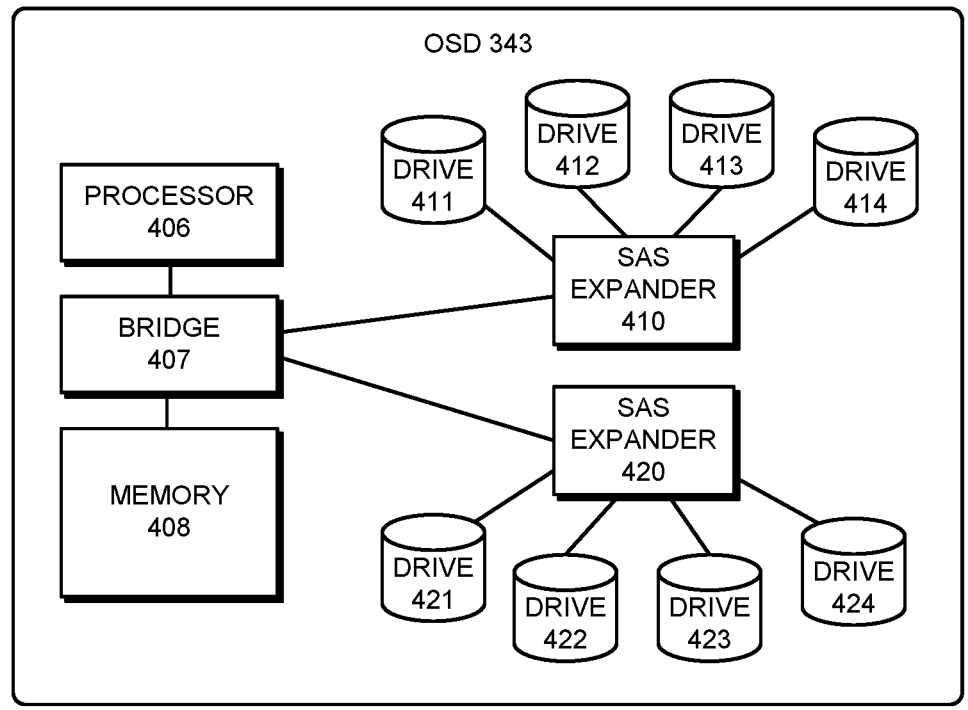
FIG. 4A illustrates the structure of an object storage device (OSD) in accordance with the disclosed embodiments.

FIG. 4A illustrates the structure of an exemplary object storage device (OSD) 343 in accordance with the disclosed embodiments. As illustrated in FIG. 4, OSD 343 includes a processor 406 that is connected to a memory 408 through a bridge 407. Processor 406 is also coupled to Serial Attached SCSI (SAS) expanders 410 and 420, where SAS expander 410 is coupled to disk drives 411-414 and SAS expander 420 is coupled to disk drives 421-424. (Note that SAS expanders 410 and 420 may be coupled to more or fewer disk drives.) Also, note that a failure in OSD 343 can involve a failure of a single one of the disk drives 411-414 or 421-424, or a failure that affects all or most of OSD 343, such as a failure in processor 406, bridge 407, memory 408, SAS expanders 410 and 420 or one of the associated data paths.

Write-Ahead Log

Figure 4B:
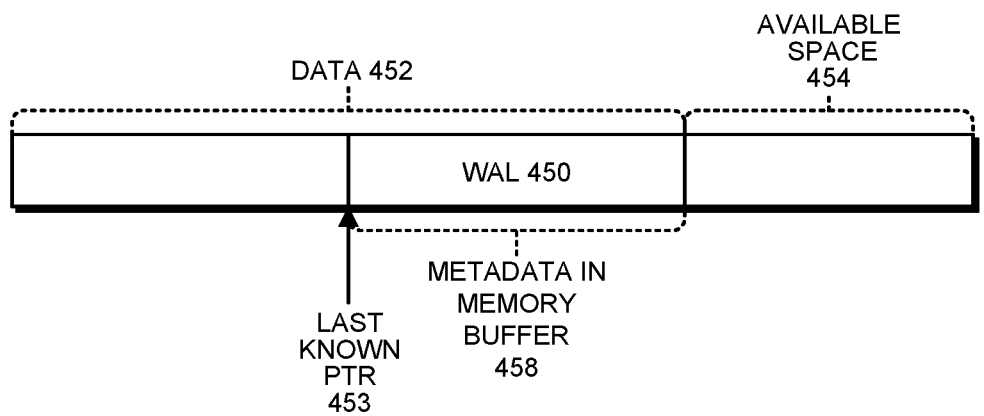
FIG. 4B illustrates the structure of a write-ahead log (WAL) in accordance with the disclosed embodiments.

FIG. 4B illustrates the structure of a write-ahead log (WAL) 450 which is maintained within an OSD (such as OSD 343) in accordance with the disclosed embodiments. WAL 450 provides a log-structured data store which is advantageous for storing immutable data. WAL 450 comprises one or more 1 GB extents which can be associated with the logical buckets described above. As illustrated in FIG. 4B, an extent can include a "data portion" 452 that has already been written to, and an unwritten portion that contains available space 454. The data blocks that are stored within data portion 452 are associated with metadata that, for example, contains hashes and the offsets for the data blocks. To improve performance, metadata associated with recently written data blocks 458 can be stored in a memory buffer. When the system recovers from a failure, all of the metadata can be reconstructed by scanning through WAL 450 starting from a last known pointer 453.

During a put( ) operation, the system synchronously appends the data block and an associated header to the WAL 450, wherein the header includes a number of data items associated with the block, including the hash and the length of the block. At the same time, the system synchronously adds metadata to the memory buffer. When a bucket becomes full, the system seals the bucket, and the bucket never gets modified again.

During a get( ) operation, the system checks the memory buffer to find the offset and length for the data block. The system then uses the offset and length to read the data block from WAL 450.

Get( ) Operation

Figure 5:
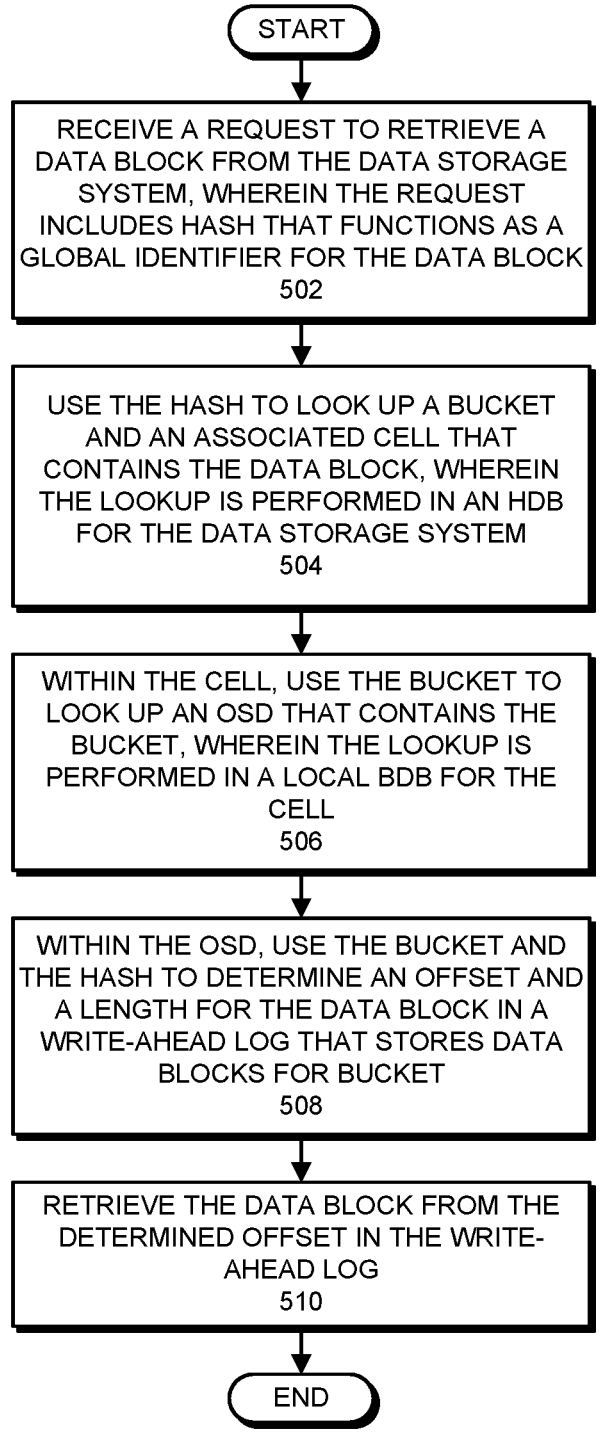
FIG. 5 presents a flow chart illustrating how a get( ) operation is processed in accordance with the disclosed embodiments.

FIG. 5 presents a flow chart illustrating how a "get( )" operation is processed in accordance with the disclosed embodiments. At the start of this process, the system receives a request to retrieve a data block from the data storage system, wherein the request was generated by a client performing a get( ) operation. This request includes a hash parameter that functions as a global identifier for the data block (step 502). Next, the system uses the hash to look up a bucket and an associated cell that contains the data block, wherein the lookup is performed in an HDB for the data storage system (step 504). Recall that the HDB can be a sharded database, and this lookup can involve examining the first byte of the hash to identify a corresponding shard, and then performing the lookup in a specific HDB instance associated with the shard. Also, recall that this lookup is likely to involve a random disk seek.

Within the cell, the system uses the bucket to look up an OSD that contains the bucket, wherein the lookup is performed in a local BDB for the cell (step 506). Recall that because the local BDB can be stored in memory, this lookup can be fast. Then, within the OSD, the system uses the bucket and the hash to determine an offset and a length for the data block in a write-ahead log that stores data blocks for the bucket (step 508). Finally, the system returns the data block from the determined offset in the write-ahead log (step 510).

Put( ) Operation

Figure 6:
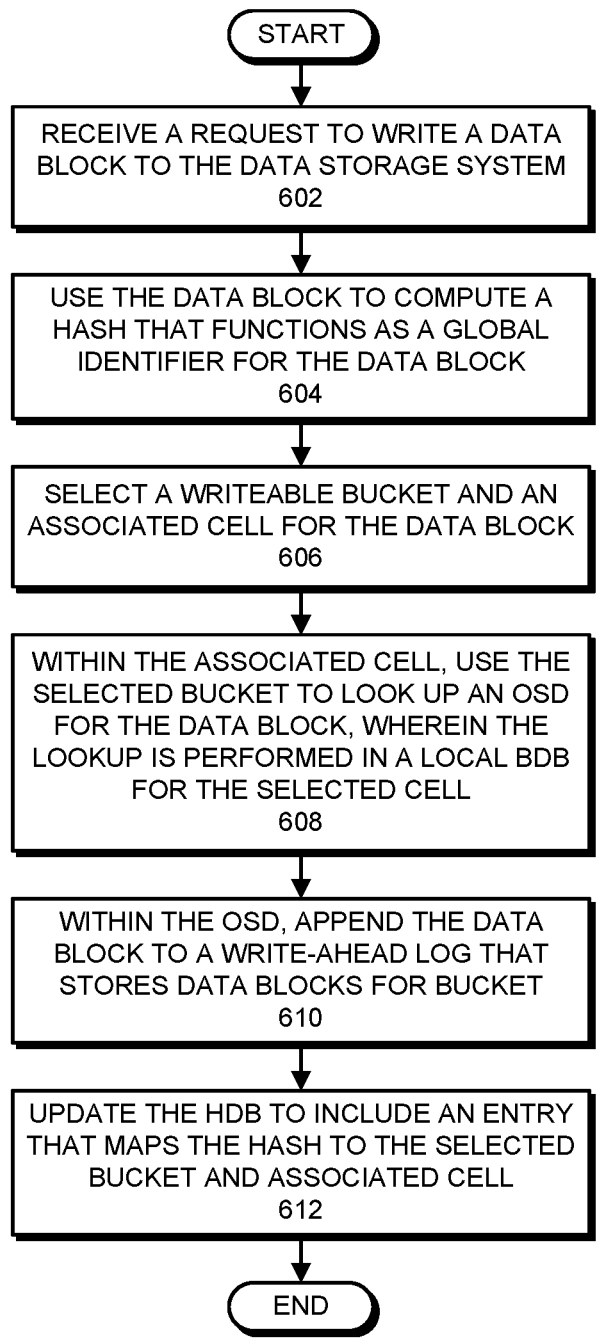
FIG. 6 presents a flow chart illustrating how a put( ) operation is processed in accordance with the disclosed embodiments.

FIG. 6 presents a flow chart illustrating how a "put( )" operation is processed in accordance with the disclosed embodiments. At the start of this process, the system receives a request to write a data block to the data storage system, wherein the request was generated by a client performing a put( ) operation (step 602). Next, the system uses the data block to compute a hash that functions as a global identifier for the data block (step 604). As mentioned above, computing this hash can involve feeding the data block through a SHA-256 hash module. Then, the system selects a writeable bucket and an associated cell for the data block (step 606). Recall that the system maintains a pool of available buckets. Within the associated cell, the system uses the selected bucket to look up an OSD for the data block, wherein the lookup is performed in a local BDB for the selected cell (step 608). Because the BDB is typically located in memory, this lookup can be fast. (Also, note that the bucket can be replicated across a number of cells, in which case the lookup returns multiple OSDs containing copies of the bucket, and the data block is written to each of the multiple OSDs.)

Next, within the OSD, the system appends the data block to a write-ahead log that stores data blocks for the bucket (step 610). Note that committing the write-ahead log to disk typically involves a sequential disk seek. Finally, the system updates the HDB to include an entry that maps the hash to the selected bucket and associated cell (step 612).

Recovering from a Storage Device Failure

Figure 7:
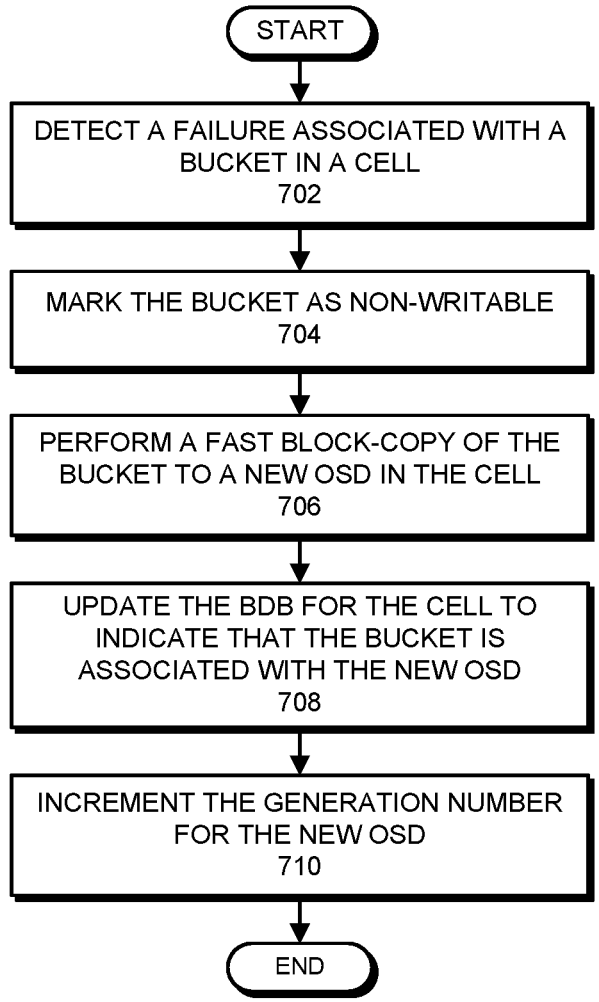
FIG. 7 presents a flow chart illustrating how a failure of a storage device is handled in accordance with the disclosed embodiments.

FIG. 7 presents a flow chart illustrating how a failure of a storage device is handled in accordance with the disclosed embodiments. At the start of this process, the system detects a failure associated with a bucket in a cell (step 702). (For example, the system can detect a failure in an OSD that stores a copy of the bucket.) Next, the system marks the bucket as non-writable (step 704). The system then performs a fast block-copy of the bucket to a new OSD in the cell (step 706). The systems also updates the BDB for the cell to indicate that the bucket is associated with the new OSD (step 708). As part of this updating operation, the system increments the new generation number for the OSD and updates the BDB with this new generation number (step 710). Recall that when a degraded OSD is restarted after a failure, it will not accept any reads or writes because its generation number is old. Note that it is important to update the BDB with the new generation number at the same time the BDB is updated to associate the bucket with the new OSD. This ensures there is no period of time where the BDB points to a new OSD in the wrong generation.

Storage Model Supporting Open and Closed Extents

As mentioned above, data storage systems often rely on locks to prevent updates to data blocks during repair operations and other operations that are adversely affected by such updates. However, locks can create performance problems for applications that need to access the data blocks. Instead of using locks, the disclosed embodiments solve this problem by placing extents (and associated volumes) in either an open state or a closed state, and then enforcing a strict state-machine separation between operations performed on extents in the open state and the closed state.

Note that an open extent (or associated open volume) is "internally mutable," which means that data can be written to it. However, an open extent is also "externally immutable," which means that the system cannot perform certain operations on the extent, including moving, merging, repairing, compacting, erasure-coding or garbage-collecting the extent. (Note that, at any given time, only a very small fraction of extents is in the open state.) In contrast, a closed extent (or associated closed volume) is internally immutable, which means that the system can move, merge, repair, compact, erasure-code or garbage-collect the closed extent.

Moreover, extents in the open state have different data formats than extents in the closed state because of the differing workloads for extents in the different states. For example, extents in the open state are tailored for append-only writes. In contrast, extents in the closed state have a more sophisticated index design to facilitate fast lookups with a low memory footprint.

Before describing how this data storage system operates, we first describe how extents are associated with volumes and buckets. As mentioned above, a "bucket" is a logical grouping of data blocks into a single conceptual unit, wherein each hash for a data block maps to a single bucket. Note that buckets are easier to manage than extremely large numbers of independent data blocks. For example, as mentioned above, a number of 1-4 MB data blocks can be aggregated into a single 1 GB bucket. Also, recall that the BDB maps hashes for data blocks to buckets, and this mapping is generally immutable. A "volume" is a mapping from one or more buckets to a set of OSDs. Note that the BDB has a separate table that maps each bucket to the volume that the bucket resides in and the OSDs that store extents for the volume. When the system uses a basic replication scheme, each volume contains a single bucket. On the other hand, when the system uses an erasure-coding storage scheme, a volume may contain multiple buckets, which are combined and coded across the set of OSDs. An "extent" contains the actual data for a given volume that is written to an OSD. More specifically, an extent is the part of a volume that resides on a single OSD. When using a basic replication scheme, there is only one bucket in each volume, and thus each extent is just the entire copy of the bucket. However, when using an erasure-coding storage scheme, each extent in the volume is different, and may either store the plaintext contents of a bucket, or parity data that is used to facilitate recovery from failures. Note that an OSD deals with extents because it rarely cares about the semantics of the data inside the extents. Moreover, a master typically deals with volumes, because it cares about moving bulk data around. Finally, front ends care about buckets, because buckets are logical containers for hashes, but they also need to map these hashes to volumes and extents to perform puts and gets on the corresponding OSDs.

Figure 8:
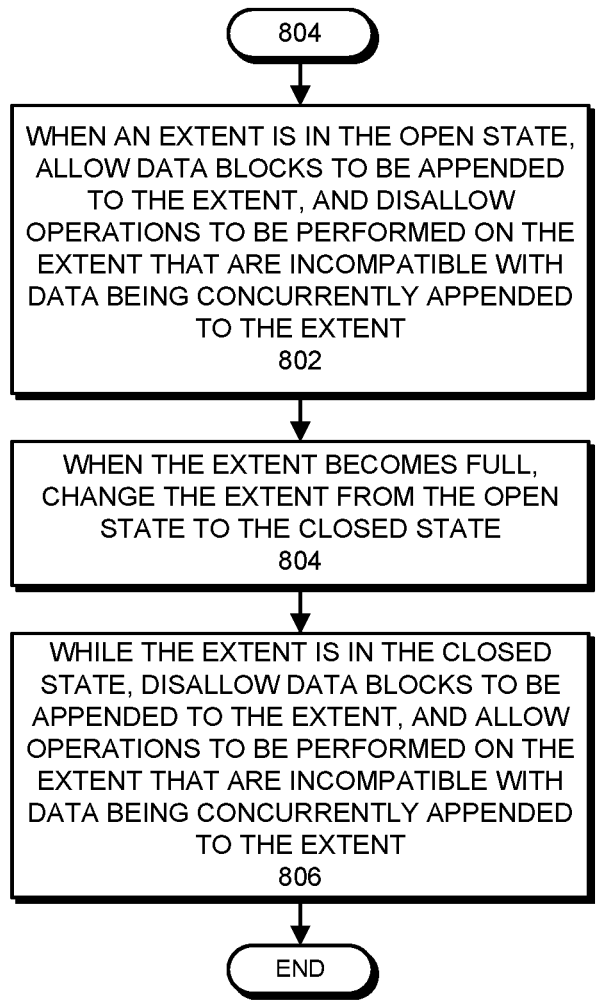
FIG. 8 presents a flow chart illustrating how an extent can be accessed in the open state and the closed state in accordance with the disclosed embodiments.

We now describe how this data storage system operates on open and closed extents. In particular, FIG. 8 presents a flow chart illustrating how an extent can be accessed in the open state and the closed state in accordance with the disclosed embodiments. When an extent is in the open state, the system allows data blocks to be appended to the extent, and disallows operations to be performed on the extent that are incompatible with data being concurrently appended to the extent (step 802). For example, operations that are incompatible with data being concurrently appended to the extent can include, but are not limited to: moving the extent; deleting the extent; merging the extent with another extent; repairing the extent; compacting the extent; garbage-collecting the extent; and erasure-coding the extent.

Next, when the extent becomes full, the system changes the extent from the open state to the closed state (step 804). Then, while the extent is in the closed state, the system disallows data blocks to be appended to the extent, and allows operations to be performed on the extent that are incompatible with data being concurrently appended to the extent (step 806).

Changing an Extent from the Open State to the Closed State

Figure 9A:
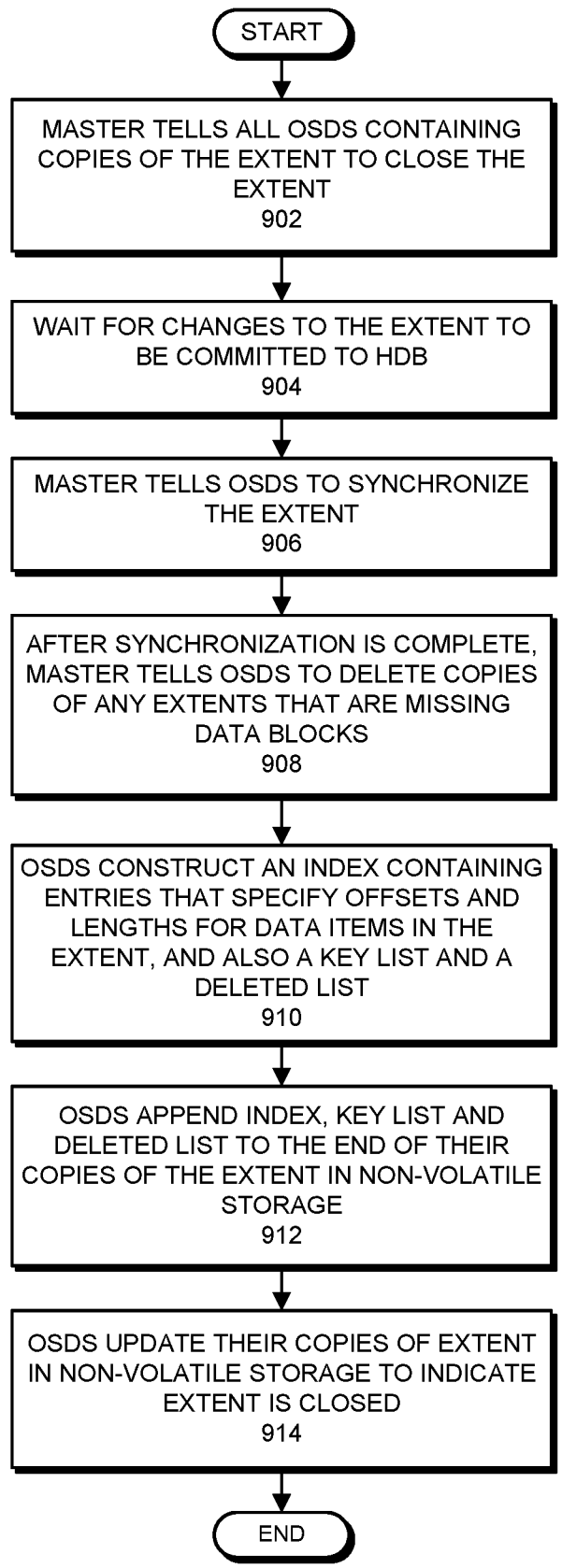
FIG. 9A presents a flow chart illustrating operations that can be performed while changing an extent from the open state to the closed state in accordance with the disclosed embodiments.

FIG. 9A presents a flow chart illustrating operations that are performed to change an extent from the open state to the closed state in accordance with the disclosed embodiments. At the start of this process, when the extent becomes full (e.g., the amount of data in the extent exceeds a threshold value) the master tells all OSDs containing copies of the extent to close the extent (step 902). The close operation succeeds if any OSD closes its local copy of the extent and refuses to perform subsequent writes to its local copy of the extent. Hence, the master considers the extent to be closed as soon as it receives an acknowledgment from one of the OSDs that the extent has been closed. The master does not wait to receive acknowledgments from all of the OSDs holding copies of the extent because it is possible for one of the OSDs to go down before it can provide such an acknowledgment.

Next, the master waits for a period of time (e.g., 24 hours) to ensure that all changes to the extent have been committed to the HDB (step 904). Then, the master tells the OSDs to synchronize the extent to ensure that all copies of the extent contain the same data blocks (step 906). This synchronization operation is described in more detail below with reference to the flow chart illustrated in FIG. 10.

During the synchronization operation, the master is informed if any of the copies of the extent are missing data blocks. The master assumes that such identified copies of the extent have been subject to a truncation operation. Note that if an extent is truncated, it is hard to determine precisely how much of the extent was truncated. Hence, after the synchronization operation is complete, the master tells the OSDs to delete any copies of the extent that are missing data blocks (step 908). After a copy of the extent is deleted, the system will eventually determine that the system is short one copy of the extent, and will replace the deleted copy by replicating another copy of the extent, which is not missing any data blocks, to another storage device.

Next, before closing the extent, all OSDs that hold copies of the extent construct an index containing entries that specify offsets and lengths for data blocks in the extent, and also generate an associated key list and deleted list (step 910). (This process is described in more detail below with reference to the closed extent illustrated in FIG. 9B.) The OSDs subsequently append the index, key list and deleted list to the end of their copy of the extent in non-volatile storage (step 912).

Finally, to complete the process of changing the extent to the closed state, the OSDs update their copies of the extent in non-volatile storage to indicate the extent is in the closed state (step 914). A close operation can possibly fail if the OSD crashes, which can possibly lead to a half-generated index. It is, therefore, important that the commit point for changing an extent from the open state to the closed state occurs when the header of the extent is updated in non-volatile storage to indicate that the extent is in the closed state.

Figure 9B:
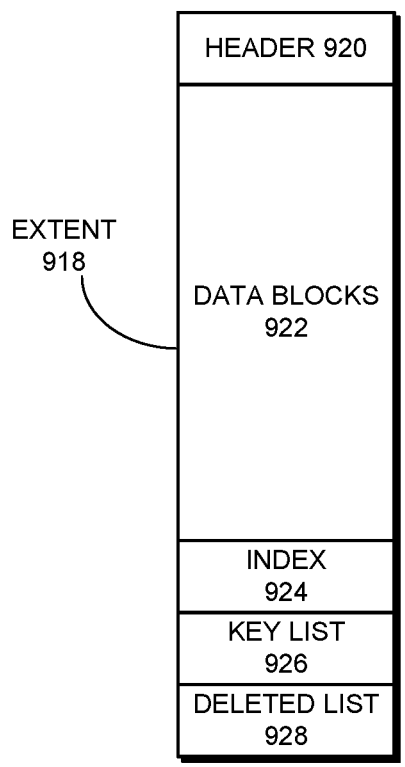
FIG. 9B illustrates the structure of an extent in accordance with the disclosed embodiments.

FIG. 9B illustrates the structure of an exemplary closed extent 918 in accordance with the disclosed embodiments. Extent 918 includes a header that contains various metadata associated with the extent, including offsets for index 924, key list 926 and deleted list 928, which are described in more detail below. Extent 918 also includes a set of data blocks 922, which has been appended to the extent. Note that each copy of the extent contains the same set of data blocks. However, the system does not perform any serialization operations while writing to the different copies of the extent, so the data blocks may be appended to each extent in a different order.

Extent 918 also includes an index 924 that facilitates looking up locations for data blocks in the extent. In general, any type of indexing structure can be used for this purpose. Some embodiments implement index 924 using a hash table, wherein each entry in the hash table is accessed using a hash key for the associated data block. Moreover, each hash table entry specifies an offset and a length for the data block within the extent to facilitate subsequently accessing the data block.

In some embodiments, index 924 is a variation of a cuckoo hash table that can be accessed to retrieve a data block as follows. First, a hash key that was generated from the data block is divided into three integers and a tag. (For example, a 16-byte hash key can be divided into three four-byte unsigned integers, and a four-byte tag.) The three integers are used as probe locations into the cuckoo hash table. The system constructs the cuckoo hash table by inserting each data block into the hash table. While inserting a given data block, if the system runs into a cycle, or if all three probe locations are taken, the system aborts the insertion process, increases the size of the cuckoo hash table and restarts the insertion process. The four-byte tag is stored in the hash table entry and, during subsequent lookup operations for a data block, is compared against four corresponding bytes of the hash key for the data block to determine whether the hash table entry is associated with the data block. After all of the data blocks are inserted into the hash table, the system performs one last pass through the data blocks and performs a lookup based on a hash key for the data block to ensure that the hash key matches a corresponding entry in one of the three probe locations.

Figure 9C:
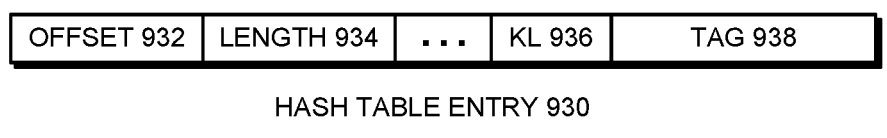
FIG. 9C illustrates a hash table entry in accordance with the disclosed embodiments.

For example, a typical hash table entry 930 is illustrated in FIG. 9C. This hash table entry 930 includes an offset 932 that specifies a location for the start of the data block in the extent, and also a length 934 for the extent. Hash table entry 930 also includes a tag 938 that is matched against a portion of a hash key for a data block during a lookup. Entry 930 also includes a key length field 936 that specifies the length of the hash key that is used to access the hash table.

Note that the variation of the cuckoo hash table described above does not actually store a full copy of the hash key for each data block. The full hash keys are instead stored in an associated key list 926. Within key list 926, the hash keys are stored in the order that their corresponding entries appear in the hash table.

Extent 918 also includes a deleted list 928 that specifies locations in the index for data blocks that have been garbage-collected from extent 918.

When closing an extent, the system can also compute and store internal checksums to cover the header 920, the data blocks 922, the index 924 and the key list 926. These internal checksums can facilitate detecting subsequent data corruption errors in extent 918.

Synchronization Operation

Figure 10:
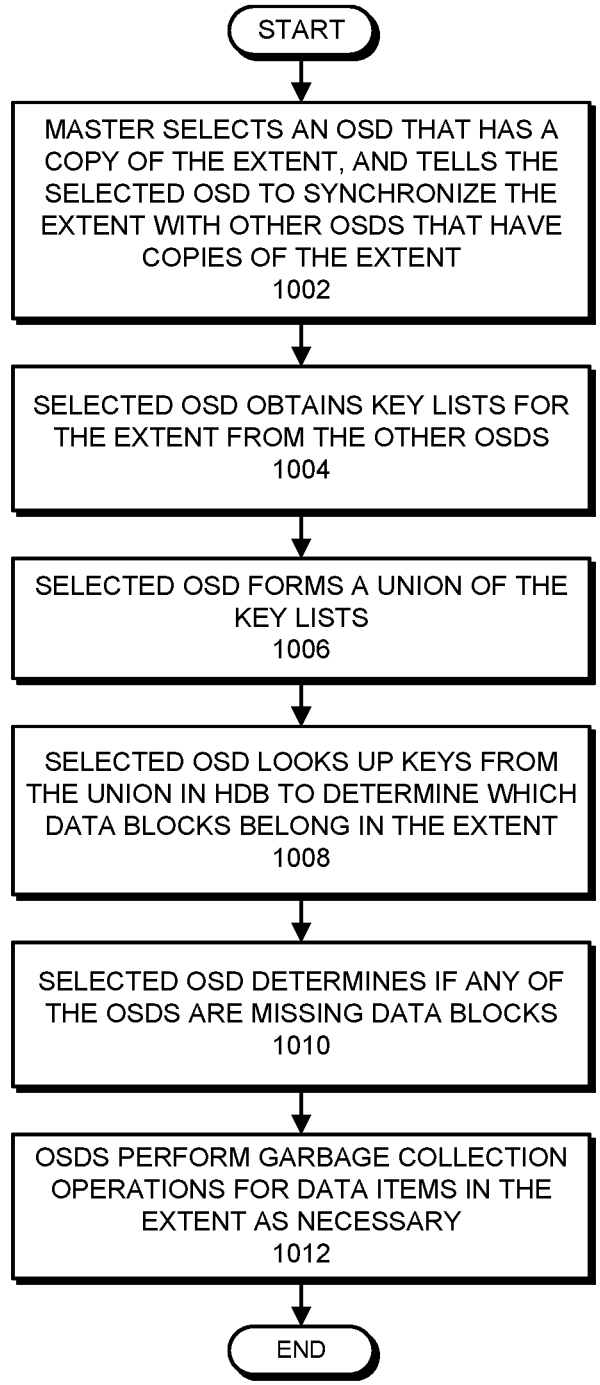
FIG. 10 presents a flow chart illustrating operations involved in synchronizing copies of an extent in accordance with the disclosed embodiments.

FIG. 10 presents a flow chart illustrating the steps involved in a synchronization operation in accordance with the disclosed embodiments. This synchronization operation starts when the master tells the OSDs associated with a volume to synchronize their associated extents in step 906 in the flow chart illustrated in FIG. 9A. More specifically, at the start of the process, the master selects one of the OSDs that has a copy of the extent, and tells the OSD to synchronize the extent with the other OSDs that have copies of the extent (step 1002). During this process, the master informs the selected OSD about the identities of the other OSDs that have copies of the extent. Note that the OSDs are stateless, so they generally do not know who their peers are. Hence, the master has to inform them about the identities of the other OSDs that hold copies of the extent. Next, the selected OSD obtains key lists for the extent from all of the other OSDs that have copies of the extent (step 1004). Then, the selected OSD forms a union of the key lists (step 1006) to identify the set of data blocks that could possibly be stored in the extent. Next, the selected OSD looks up the keys in the union in the HDB to determine which data blocks belong in the extent (step 1008). Because of resource constraints, it is impractical for the system to maintain an index that maps extents to hashes for all data blocks in the extent. Because an extent-to-hash index does not exist, the system needs to examine the extents to determine which hashes they contain, and then intersects this set of hashes with the HDB to definitively determine which data blocks are contained in the extent.

Next, the selected OSD uses the knowledge about which data blocks belong in the extent to determine if any of the OSDs that have copies of the extent are missing data blocks (step 1010). The system then lets the master know which OSDs are missing data blocks (as is discussed above with reference to step 906 in the flow chart in FIG. 9A).

Finally, the OSDs perform garbage-collection operations to remove data blocks from their copy of the extent that do not belong in the extent (step 1012). During this process, the OSDs update the index for their copy of the extent appropriately, and add keys for any garbage-collected data blocks to a "deleted list" for the extent.

Note that the above-described synchronization operation only handles truncation errors; it does not handle bit-flip errors. Bit-flip errors can be handled through checksums, or through error-correcting and error-detecting codes that are built into the underlying data storage format.

Reconstructing In-Memory Indices During Failure Recovery

Figure 11:
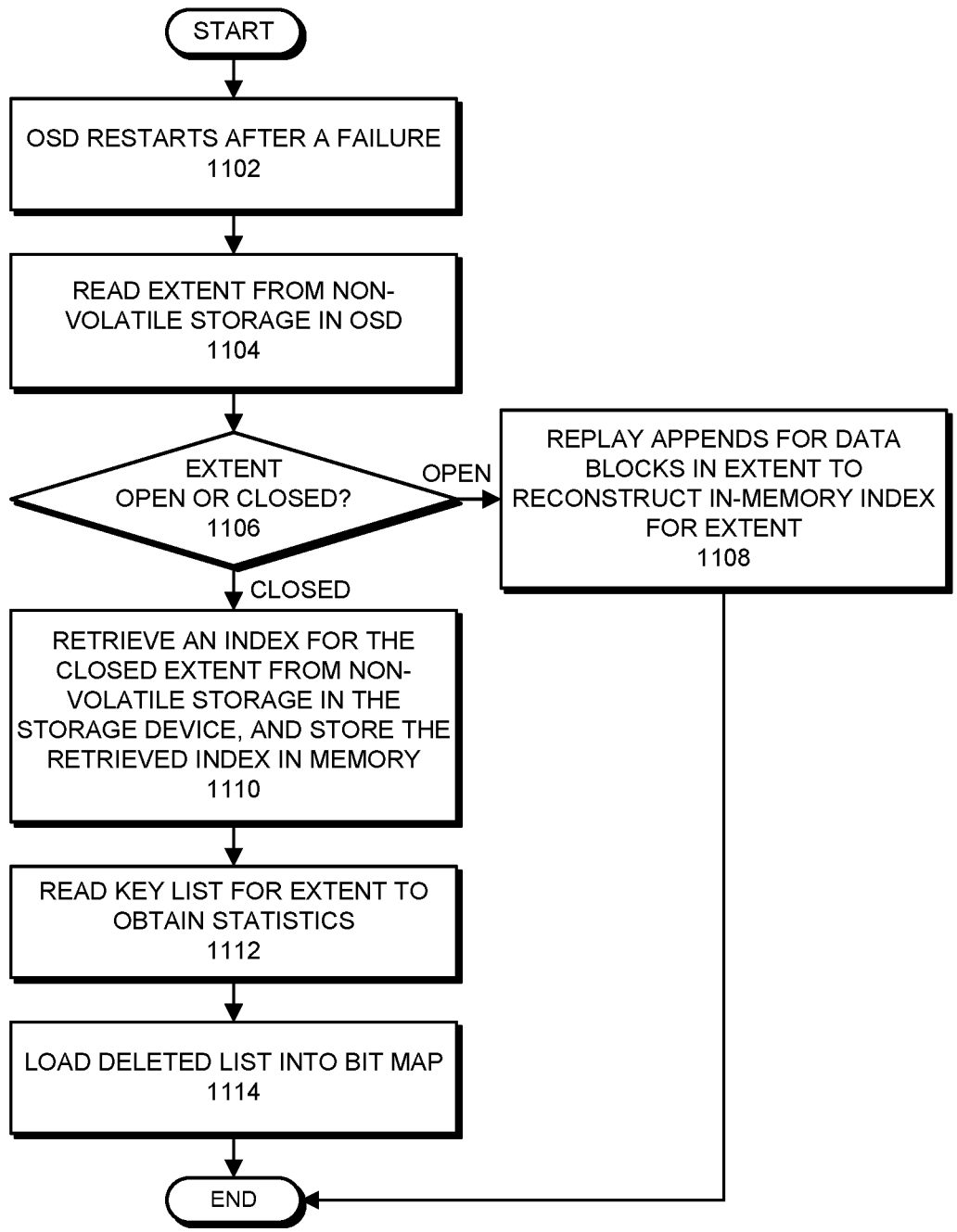
FIG. 11 presents a flow chart illustrating how indices are reconstructed after a storage device recovers from a failure in accordance with the disclosed embodiments.

FIG. 11 presents a flow chart illustrating how in-memory indices for extents are reconstructed after a storage device recovers from a failure in accordance with the disclosed embodiments. (Note that this technique can also be used in cases where the OSD is restarted for code pushes or for other operational reasons.) This reconstruction process occurs when an OSD reboots after a failure (step 1102). During this reconstruction process, the OSD is configured to construct an index for each extent in the storage device to facilitate fast lookups of data blocks contained in the extent.

For a given extent, the system first reads the extent from non-volatile storage in the OSD (step 1104). During this process, the system reads the header for the extent to determine whether the extent is in the open state or the closed state (1106). If the extent is in the open state, the system replays appends for data blocks in the open extent to reconstruct the in-memory index for the open extent (step 1108). After the appends have been replayed, the index for the open extent resides in memory. Note that processing an open extent is extremely time-consuming, because all of the operations involved in appending a data block to the extent need to be repeated for all of the data blocks in the extent.

In contrast, if the extent is in the closed state, the system retrieves an index for the closed extent from non-volatile storage in the OSD, and stores the retrieved index in memory at the OSD to facilitate fast lookups into the index (step 1110). Note that the system reads the header to obtain the offset for the stored index and also the offsets for the key list and the deleted list. After the index has been retrieved, the system reads the key list to obtain statistics about how many data blocks are stored in the extent (step 1112). The system also loads the deleted list into a bit map (step 1114), and additionally determines an end-of-file for the extent. Note that the system can use checksums to ensure that no mid-way truncations exist in the extent. Also, note that processing a closed extent can be very fast, because the stored index can simply be accessed from disk, instead of having to replay the appends for all of the data blocks to reconstruct the index.

Figure 12:
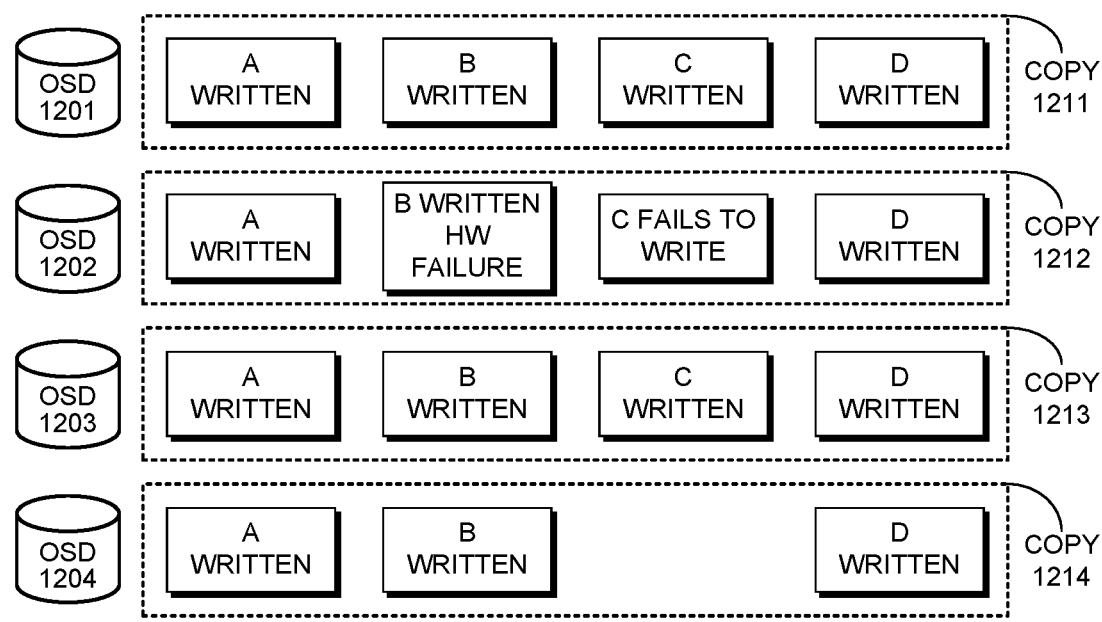
FIG. 12 presents an exemplary sequence of writes to copies of an extent in accordance with the disclosed embodiments.

FIG. 12 presents an exemplary sequence of writes to copies of an extent in accordance with the disclosed embodiments. In this example, four OSDs 1201-1204 include copies 1211-1214 of the same extent that are associated with a single volume. At the start of the sequence of writes, the data block A is written to each of the four copies of the extent 1211-1214. All of these writes succeed and acknowledgments are sent back to the associated front end. Next, an entry in the HDB associated with the hash for data block A is updated to indicate that data block A is contained in a bucket associated with the extent.

Next, data block B is written to each of the four extents 1211-1214 and acknowledgments are sent back to the associated front end. However, in this case hardware in OSD 1202 fails, which causes B to fail to be written to non-volatile storage in OSD 1202. However, because acknowledgments for all of the extents were sent to the associated front end, an entry in the HDB associated with the hash for data block B is erroneously updated to indicate that data block B is contained in the bucket associated with the extent.

Then, data block C is written to extents 1211 and 1213 in OSDs 1201 and 1203, but fails to write to extent 1212 in OSD 1202 because of the preceding hardware failure in OSD 1202. Because of the failure to write to extent 1212, the system does not attempt to write data block C to extent 1214 in OSD 1204. The writes to extents 1211 and 1213 are acknowledged back to the associated front end. However, because of the failed write to extent 1212 in OSD 1202, HDB is not updated to indicate that data block B is stored in the bucket associated with the extent.

Finally, OSD 1202 recovers from its failure and comes back on line, and data block D is subsequently written to each of the four copies of the extent 1211-1214. All of these writes succeed and acknowledgments are sent to the associated front end. Next, an entry in the HDB associated with the hash for data block D is updated to indicate that data block D is contained in the bucket associated with the extent.

Next, during a subsequent synchronization operation for the extent, a selected OSD forms the union of all keys for data blocks contained in all copies of the extent. In this case, the union will include keys for data blocks A, B, C and D because all of these data blocks are present in at least one extent. Next, the keys in the union are intersected with the HDB. In this case, because data block C failed to write to OSD 1202, the HDB does not indicate that data block C is contained in the bucket associated with the extent. However, note that the HDB verifies that A, B and D are contained in the bucket. Hence, the intersection will yield keys for data blocks A, B and D.

At this point the selected OSD tells the master that OSD 1202 is missing keys. This will cause the master to delete the copy of the extent from OSD 1202. At a later point in time, the system will determine that there are only three copies of the extent, instead of the desired four. As a consequence, the system will perform a normal repair operation that will clone a copy of the extent from one of the three remaining OSDs that have copies. In some embodiments, the system does not actually delete the copy of the extent from OSD 1202. The system simply moves it to a back up location for a period of time to facilitate subsequent diagnostic operations.

The foregoing descriptions of embodiments have been presented for purposes of illustration and description only. They are not intended to be exhaustive or to limit the present description to the forms disclosed. Accordingly, many modifications and variations will be apparent to practitioners skilled in the art. Additionally, the above disclosure is not intended to limit the present description. The scope of the present description is defined by the appended claims.

What is claimed is:

1. A computer-implemented method, comprising:
   storing sets of data blocks in extents, the extents stored in storage devices in a data storage system; and
   changing a particular extent, of the extents, from an open state to a closed state;
   wherein changing the particular extent from the open state to the closed state is based, at least in part, on constructing an index to facilitate accessing data blocks in a particular copy of the particular extent; and appending the index to the particular copy of the particular extent in non-volatile storage of a storage device in which the particular copy of the particular extent is stored.

2. The computer-implemented method of claim 1, wherein constructing the index includes constructing a hash table by:
   obtaining a hash key for each data block in the particular copy of the particular extent; and
   using the obtained hash keys to construct the hash table that contains entries for each data block in the particular copy of the particular extent, wherein each entry in the hash table specifies an offset and a length of an associated data block within the particular copy of the particular extent to facilitate subsequently accessing the data block.

3. The computer-implemented method of claim 2,
   wherein constructing the hash table includes constructing a cuckoo hash table; and
   wherein a hash key for each data block is divided into multiple integers and a checksum, wherein the multiple integers provide probe locations for the data block in the cuckoo hash table, and wherein the checksum is stored as a key in an entry for the data block in the cuckoo hash table.

4. The computer-implemented method of claim 2,
   wherein constructing the hash table includes constructing a key list that includes a hash key for each entry in the hash table; and
   wherein appending the index to the particular copy of the particular extent in non-volatile storage additionally involves appending the key list to the particular copy of the particular extent.

5. The computer-implemented method of claim 2,
   wherein constructing the index includes constructing a deleted list that specifies locations in the index for data blocks that have been garbage-collected from the extent; and
   wherein appending the index to the particular copy of the particular extent in non-volatile storage additionally involves appending the deleted list to the particular copy of the particular extent.

6. The computer-implemented method of claim 1, wherein changing the extent from the open state to the closed state further includes updating the extent in non-volatile storage in one or more storage devices that contain copies of the extent to indicate that the extent is in the closed state.

7. The computer-implemented method of claim 1, further comprising:
   during a reboot of a storage device in the data storage system after the storage device fails, initializing an in-memory index for each extent in the storage device;
   wherein initializing an in-memory index for an open extent involves replaying appends for data blocks in the open extent to initialize the in-memory index; and
   wherein initializing an in-memory index for a closed extent involves retrieving an index for the closed extent from non-volatile storage in the storage device, and storing the retrieved index in memory at the storage device.

8. The computer-implemented method of claim 1, wherein the method further comprises:
   receiving a request to retrieve a data block from the data storage system, wherein the request includes a hash key for the data block;
   using the hash key to look up an extent that contains the data block and an associated storage device that contains the extent;
   performing, at the storage device, a lookup based on the hash key in an in-memory index for the extent to determine an offset and a length for the data block in the extent; and
   returning the data block from the determined offset in the extent.

9. The computer-implemented method of claim 1, further comprising:
   receiving a request to write a data block to the data storage system;
   computing a hash key from the data block, wherein the hash key provides an identifier for the data block;
   selecting an open extent and an associated storage device to write the data block to;
   appending the data block to the open extent in the storage device; and
   updating, at the storage device, an in-memory index for the open extent to include an entry for the data block that specifies an offset and a length for the data block within the extent to facilitate subsequent accesses to the data block based on the hash key.

10. A non-transitory computer-readable storage medium storing instructions that when executed by a computer system cause the computer system to perform:
- storing sets of data blocks in extents, the extents stored in storage devices in a data storage system; and
- changing a particular extent, of the extents, from an open state to a closed state;
- wherein changing the particular extent from the open state to the closed state is based, at least in part, on constructing an index to facilitate accessing data blocks in a particular copy of the particular extent; and appending the index to the particular copy of the particular extent in non-volatile storage of a storage device in which the particular copy of the particular extent is stored.

11. The non-transitory computer-readable storage medium of claim 10, wherein constructing the index includes constructing a hash table by:
- obtaining a hash key for each data block in the particular copy of the particular extent; and
- using the obtained hash keys to construct the hash table that contains entries for each data block in the particular copy of the particular extent, wherein each entry in the hash table specifies an offset and a length of an associated data block within the particular copy of the particular extent to facilitate subsequently accessing the data block.

12. The non-transitory computer-readable storage medium of claim 11,
- wherein constructing the hash table includes constructing a cuckoo hash table; and
- wherein a hash key for each data block is divided into multiple integers and a checksum, wherein the multiple integers provide probe locations for the data block in the cuckoo hash table, and wherein the checksum is stored as a key in an entry for the data block in the cuckoo hash table.

13. The non-transitory computer-readable storage medium of claim 11,
- wherein constructing the hash table includes constructing a key list that includes a hash key for each entry in the hash table; and
- wherein appending the index to the particular copy of the particular extent in non-volatile storage additionally involves appending the key list to the particular copy of the particular extent.

14. The non-transitory computer-readable storage medium of claim 11,
- wherein constructing the index includes constructing a deleted list that specifies locations in the index for data blocks that have been garbage-collected from the extent; and
- wherein appending the index to the particular copy of the particular extent in non-volatile storage additionally involves appending the deleted list to the particular copy of the particular extent.

15. The non-transitory computer-readable storage medium of claim 10, wherein changing the extent from the open state to the closed state further includes updating the extent in non-volatile storage in one or more storage devices that contain copies of the extent to indicate that the extent is in the closed state.

16. The non-transitory computer-readable storage medium of claim 10, the instructions comprising instructions that when executed by the computer system cause the computer system to further perform:
- during a reboot of a storage device in the data storage system after the storage device fails, initializing an in-memory index for each extent in the storage device;
- wherein initializing an in-memory index for an open extent involves replaying appends for data blocks in the open extent to initialize the in-memory index; and
- wherein initializing an in-memory index for a closed extent involves retrieving an index for the closed extent from non-volatile storage in the storage device, and storing the retrieved index in memory at the storage device.

17. A computer system, comprising:
one or more processors;
one or more non-transitory storage media storing instructions configured execution by the one or more processors, the instructions configured to perform:
- storing sets of data blocks in extents, the extents stored in storage devices in a data storage system; and
- changing a particular extent, of the extents, from an open state to a closed state;
- wherein changing the particular extent from the open state to the closed state is based, at least in part, on constructing an index to facilitate accessing data blocks in a particular copy of the particular extent; and appending the index to the particular copy of the particular extent in non-volatile storage of a storage device in which the particular copy of the particular extent is stored.

18. The computer system of claim 17, wherein constructing the index includes constructing a hash table by:
- obtaining a hash key for each data block in the particular copy of the particular extent; and
- using the obtained hash keys to construct the hash table that contains entries for each data block in the particular copy of the particular extent, wherein each entry in the hash table specifies an offset and a length of an associated data block within the particular copy of the particular extent to facilitate subsequently accessing the data block.

19. The computer system of claim 18,
- wherein constructing the hash table includes constructing a cuckoo hash table; and
- wherein a hash key for each data block is divided into multiple integers and a checksum, wherein the multiple integers provide probe locations for the data block in the cuckoo hash table, and wherein the checksum is stored as a key in an entry for the data block in the cuckoo hash table.

20. The computer system of claim 18,
- wherein constructing the hash table includes constructing a key list that includes a hash key for each entry in the hash table; and
- wherein appending the index to the particular copy of the particular extent in non-volatile storage additionally involves appending the key list to the particular copy of the particular extent.

21. The computer system of claim 18,
- wherein constructing the index includes constructing a deleted list that specifies locations in the index for data blocks that have been garbage-collected from the extent; and
- wherein appending the index to the particular copy of the particular extent in non-volatile storage additionally involves appending the deleted list to the particular copy of the particular extent.

22. The computer system of claim 17, wherein changing the extent from the open state to the closed state further includes updating the extent in non-volatile storage in one or more storage devices that contain copies of the extent to indicate that the extent is in the closed state.

23. The computer system of claim 17, the instructions further configured to perform:
   during a reboot of a storage device in the data storage system after the storage device fails, initializing an in-memory index for each extent in the storage device;
   wherein initializing an in-memory index for an open extent involves replaying appends for data blocks in the open extent to initialize the in-memory index; and
   wherein initializing an in-memory index for a closed extent involves retrieving an index for the closed extent from non-volatile storage in the storage device, and storing the retrieved index in memory at the storage device.

\* \* \* \* \*